United States Patent
Carini et al.

(10) Patent No.: US 12,162,628 B2
(45) Date of Patent: Dec. 10, 2024

(54) CONFIGURABLE SENSING SYSTEMS AND METHODS FOR CONFIGURATION

(71) Applicant: Simmonds Precision Products, Inc., Vergennes, VT (US)

(72) Inventors: Peter J. Carini, Underhill, VT (US); Thomas Henck, Huntington, VT (US); Travis Gang, Hinesburg, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 1017 days.

(21) Appl. No.: 16/728,647

(22) Filed: Dec. 27, 2019

(65) Prior Publication Data

US 2021/0197986 A1    Jul. 1, 2021

(51) Int. Cl.
*B64F 5/60* (2017.01)
*G01P 15/00* (2006.01)

(52) U.S. Cl.
CPC ............... *B64F 5/60* (2017.01); *G01P 15/00* (2013.01)

(58) Field of Classification Search
CPC . B64F 5/60; G01P 15/00; G05B 2219/25428; G05B 19/0426
See application file for complete search history.

(56) References Cited

U.S. PATENT DOCUMENTS

| 4,303,978 A | 12/1981 | Shaw et al. |
| 7,552,256 B2 | 6/2009 | Ellerbrock et al. |
| 8,321,084 B2 | 11/2012 | Yamashita et al. |
| 9,772,238 B2 | 9/2017 | Preston et al. |
| 9,794,126 B2 | 10/2017 | Gang |
| 2003/0154332 A1* | 8/2003 | Tserng ............... G06F 9/505 710/52 |

(Continued)

FOREIGN PATENT DOCUMENTS

| WO | 2002033558 A1 | 4/2002 |
| WO | 2019214825 A1 | 11/2019 |

OTHER PUBLICATIONS

Jong Jin Won et al: "Deterministic Multi-dimensional Task Scheduling Algorithms for Wearable Sensor Devices", KSII Transactions on Internet and Information Systems, vol. 8, No. 10, Oct. 31, 2014 (Oct. 31, 2014), pp. 3423-3438, XP055705899.

(Continued)

*Primary Examiner* — Mohammad K Islam
(74) *Attorney, Agent, or Firm* — Kinney & Lange, P.A.

(57) ABSTRACT

A sensor system can include a sensor configured to output raw sensor data, a plurality of processing modules configured to process the raw sensor data from the sensor to output processed sensor data, a state module for each processing module operative to cause a respective processing module to receive and/or process the sensor data, and a control module configured to receive a coded bitstring and activate or deactivate a predefined set of state modules based on the coded bitstring to control which processing modules process the sensor data and/or an order of processing. The coded bitstring can include a plurality of discrete bits less than the amount of processing modules and/or state modules. A plurality of the state modules and/or processing modules can be associated with at least one discrete bit of the plurality of discrete bits such that each coded bitstring corresponds to a predetermined group of state modules and/or processing modules.

18 Claims, 5 Drawing Sheets

(56) References Cited

U.S. PATENT DOCUMENTS

| | | | | |
|---|---|---|---|---|
| 2012/0127011 A1* | 5/2012 | Lee | ............ | H04L 67/51 |
| | | | | 341/176 |
| 2013/0345901 A1* | 12/2013 | Maeda | ............ | G01P 15/00 |
| | | | | 701/1 |
| 2019/0281144 A1* | 9/2019 | Sachs | ............ | H04L 69/28 |
| 2020/0104740 A1* | 4/2020 | Cao | ............ | G06N 10/60 |
| 2020/0260162 A1* | 8/2020 | Henck | ............ | H04Q 9/00 |
| 2020/0394446 A1* | 12/2020 | Tiwari | ............ | G06F 18/22 |

OTHER PUBLICATIONS

Extended European search report issued in corresponding EP application No. 20216986.8, dated May 27, 2021.

* cited by examiner

Processing Types

| Bit Code | Lo Pass | Hi Pass | RMS | FIR | AVG | | | FFT | Raw Data |
|---|---|---|---|---|---|---|---|---|---|
| n 3 2 1 |  |  |  |  |  |  |  |  |  |
| 0 0 0 0 |  |  |  |  |  |  |  |  | ✓ |
| 0 0 0 1 |  | Hi Pass | RMS |  | AVG |  |  | FFT |  |
| 0 0 1 0 | Lo Pass |  | RMS | FIR |  |  |  | FFT |  |
| ... |  |  |  |  |  |  |  |  |  |

CONFIGURABLE SENSING SYSTEMS AND METHODS FOR CONFIGURATION

BACKGROUND

1. Field

This disclosure relates to sensing systems, more specifically to configurable sensing systems.

2. Description of Related Art

As sensing systems become more distributed and processing power becomes more available close to the sensing location, the desire to perform value added processing at that location increases as well. This provides both valuable indications from the data being captured quickly and decreases the amount of data passed through the system data bus. Traditional systems do not include configurable processing options and the hardware and/or firmware/software must be subjected to recertification for a new application, for example.

Such conventional methods and systems have generally been considered satisfactory for their intended purpose. However, there is still a need in the art for configurable systems, e.g., sensing systems and methods. The present disclosure provides a solution for this need.

SUMMARY

A sensor system can include a sensor configured to output raw sensor data, a plurality of processing modules configured to process the raw sensor data from the sensor to output processed sensor data, a state module for each processing module operative to cause a respective processing module to receive and/or process the sensor data, and a control module configured to receive a coded bitstring and activate or deactivate a predefined set of state modules based on the coded bitstring to control which processing modules process the sensor data and/or an order of processing. The coded bitstring can include a plurality of discrete bits less than the amount of processing modules and/or state modules. A plurality of the state modules and/or processing modules can be associated with at least one discrete bit of the plurality of discrete bits such that each coded bitstring corresponds to a predetermined group of state modules and/or processing modules.

Each discrete bit can be configured to include a 1 or a 0 such that each coded bitstring can be a bitstring consisting of 1s and/or 0s. The predetermined group of state modules can be configured to be turned on (e.g., to cause data to be processed by the group of processing module) for an associated bitstring, and a remainder of state modules can be configured to be turned off for the associated bitstring (e.g., to bypass the remaining processing modules).

The plurality of state modules can be configured to be turned on when an associated bit of the plurality of discrete bits is a 1. The plurality of state modules can be configured to be turned off when the associated bit is 0. In certain embodiments, each of the state modules can be associated with at least one discrete bit of the plurality of discrete bits such that at each of the state modules can be turned on and off.

Each state module can be connected to an input of a respective processing module and an input of a respective logic gate (e.g., an OR block, NOR block, XOR block, NAND block), wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

The system can include a first state module configured to receive raw sensor data from the sensor or a first logic gate connected to the sensor. The system can include a last state module or last logic gate configured to output processed data from the sensor system. In certain embodiments, each state module after the first state module can be connected to a respective logic gate to receive an input from the respective logic gate.

The sensor can be a data probe for an aircraft. The data probe can include an accelerometer, for example. In certain embodiments, the sensor can be one or more of a strain gage, a temperature sensor, a position sensor, an accelerometer, a tachometer sensor, an index sensor, a magnetic pickup, a pressure sensor, a load sensor, a flow sensor, a discrete input/output sensor of Ground/Open, or a discrete input/output sensor with a range of 0.01-30 volts/Open, for example. Any suitable type of sensor and/or physical structure therefor is contemplated herein.

In accordance with at least one aspect of this disclosure, a signal processing system can include a plurality of processing modules configured to process raw sensor data from a sensor to output processed sensor data, a state module for each processing module operative to cause a respective processing module to receive and/or process the sensor data, and a control module configured to receive a coded bitstring and activate or deactivate a predefined set of state modules based on the coded bitstring to control which processing modules process the sensor data and/or an order of processing. Any other suitable embodiments of the signal processing system are contemplated herein (e.g., as described above with respect to a sensor system).

A method for signal processing (e.g., in a sensor system) can include creating a coded bitstring having a plurality of discrete bits, each discrete bit or the plurality of discrete bits associated with a plurality processing modules, sending the coded bitstring to a control module to control which processing modules process sensor data and/or in which order, selecting processing modules and/or an order thereof to process sensor data using the control module based on the coded bitstring, and processing sensor data using the processing modules in accordance with the coded bitstring to output processed data. Creating the coded bitstring can include assigning a 1 or a 0 to each discrete bit. In certain embodiments, selecting processing modules can include using a plurality of respective processing modules when an associated bit is a 1, and not using a plurality of respective processing modules when an associated bit is a 0. In certain embodiments selecting processing modules can include correlating a coded bitstring (e.g., a bitstring of 1s and 0s) to a predetermined plurality of on states for a first plurality of state modules, and off states for a second plurality of state modules (e.g., a remainder of state modules).

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
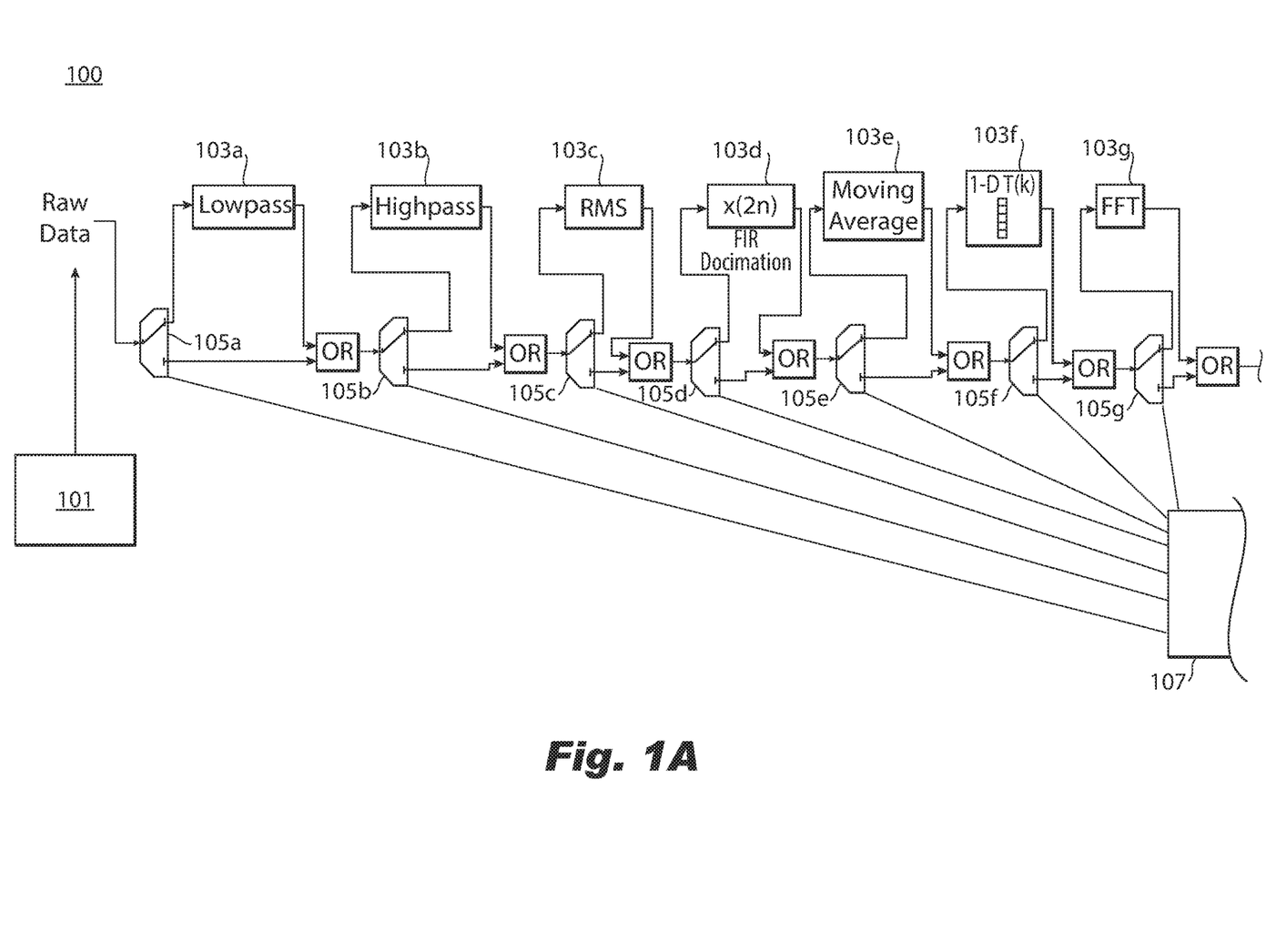
FIGS. 1A and 1B are a schematic diagram of an embodiment of a sensor system in accordance with this disclosure.
Figure 1B:
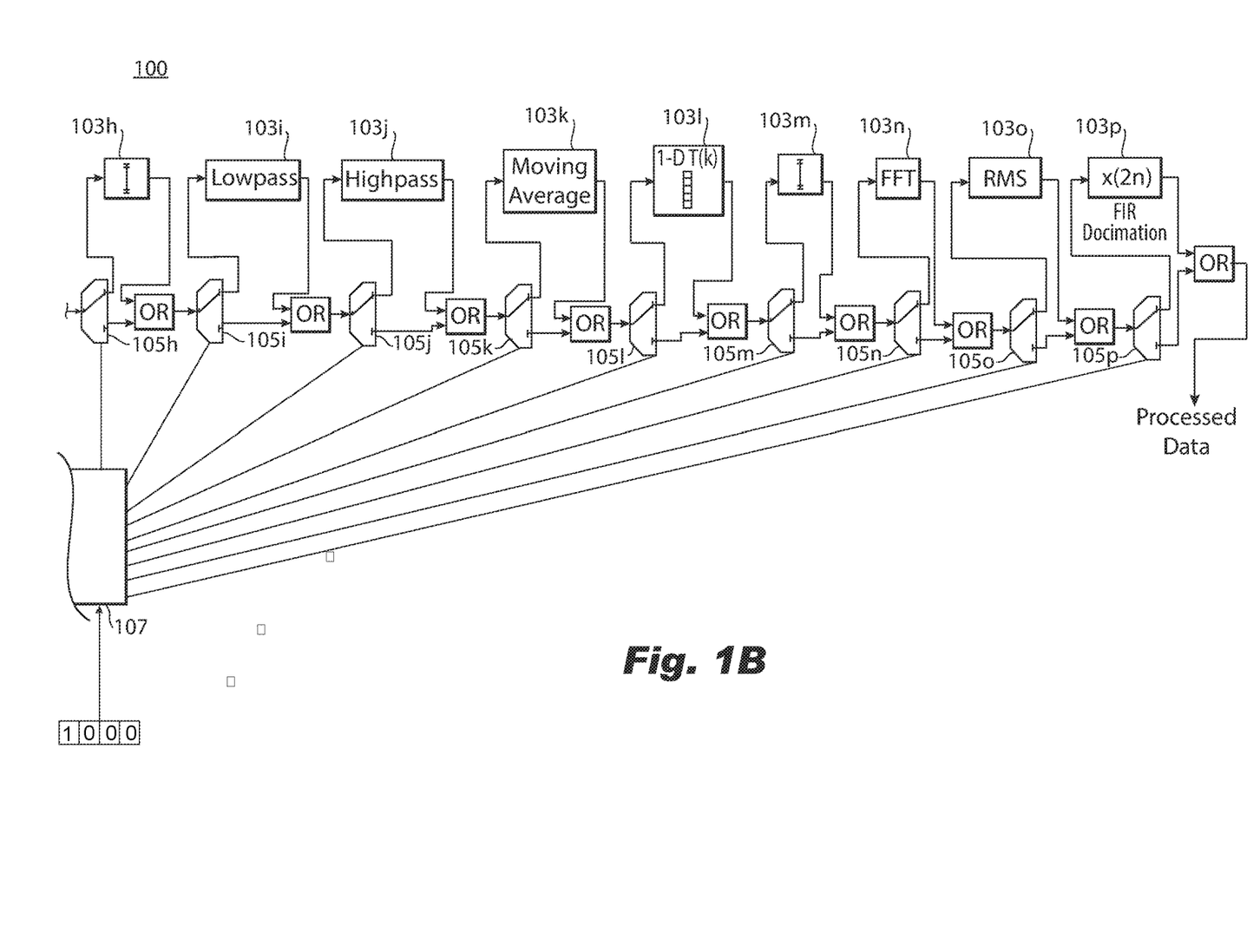
Figure 2A:
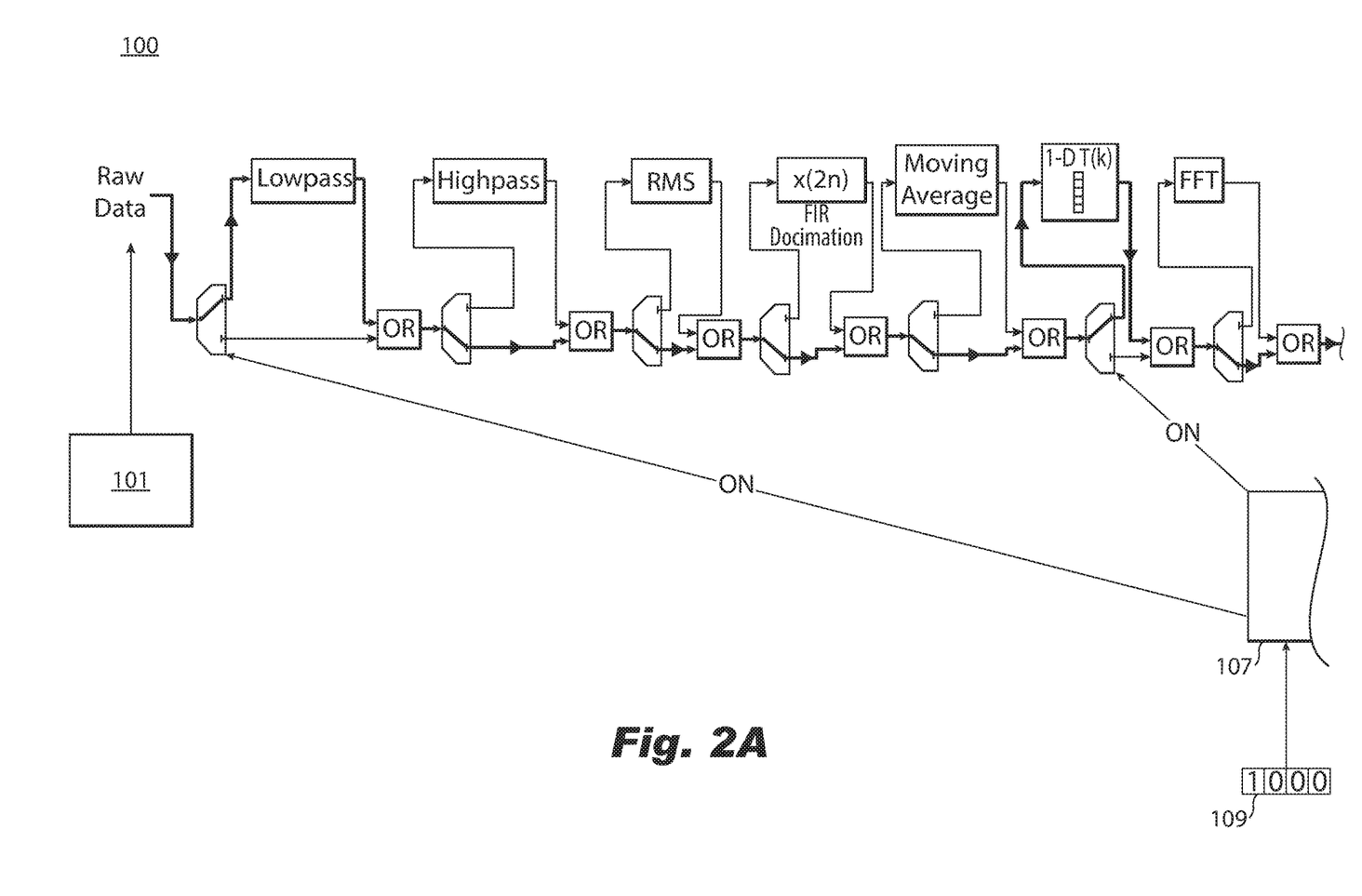
FIGS. 2A and 2B are a schematic diagram of the embodiment of FIGS. 1A and 1B, shown configured as a function of an embodiment of a coded bitstring.
Figure 2B:
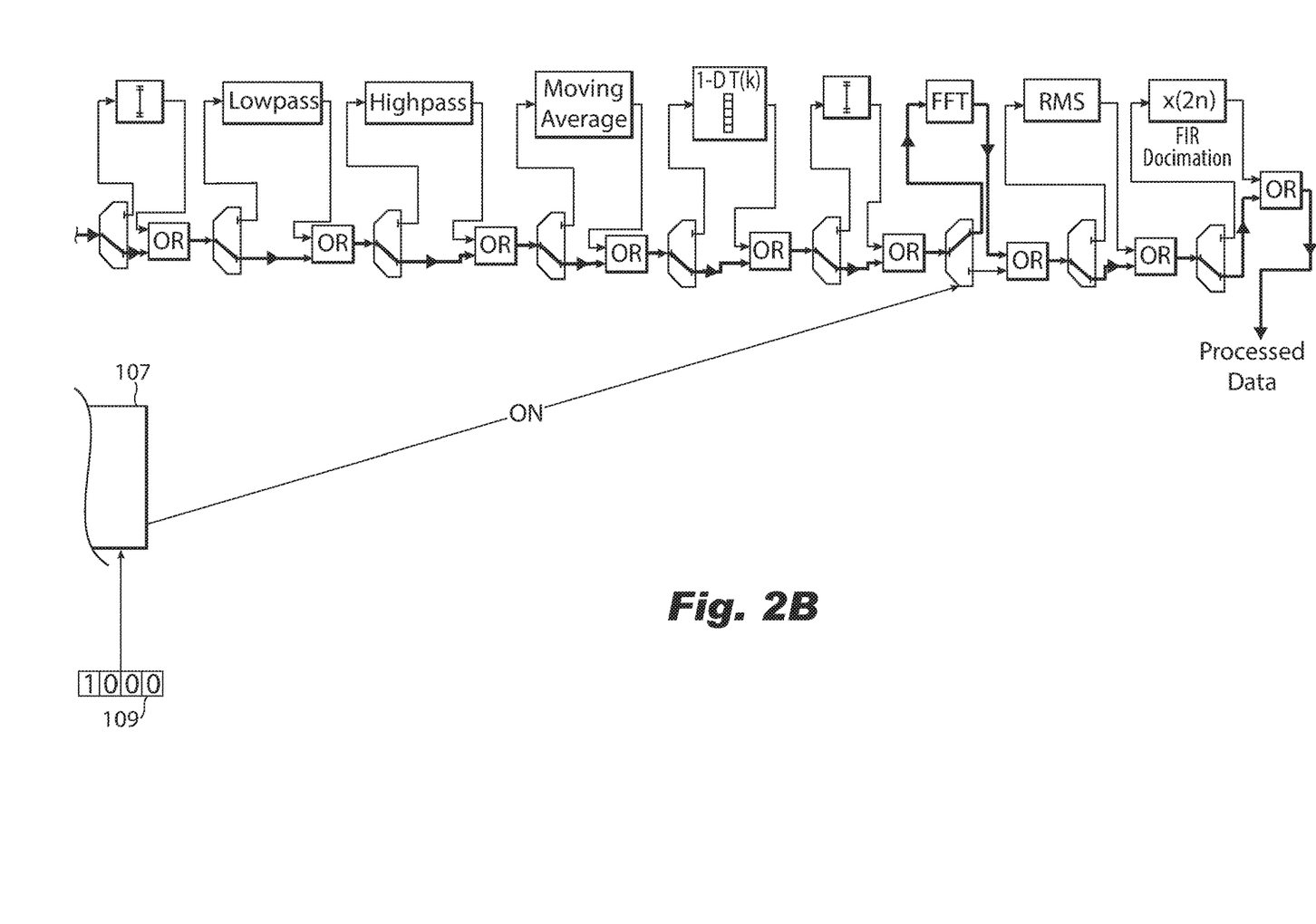
Figure 3:
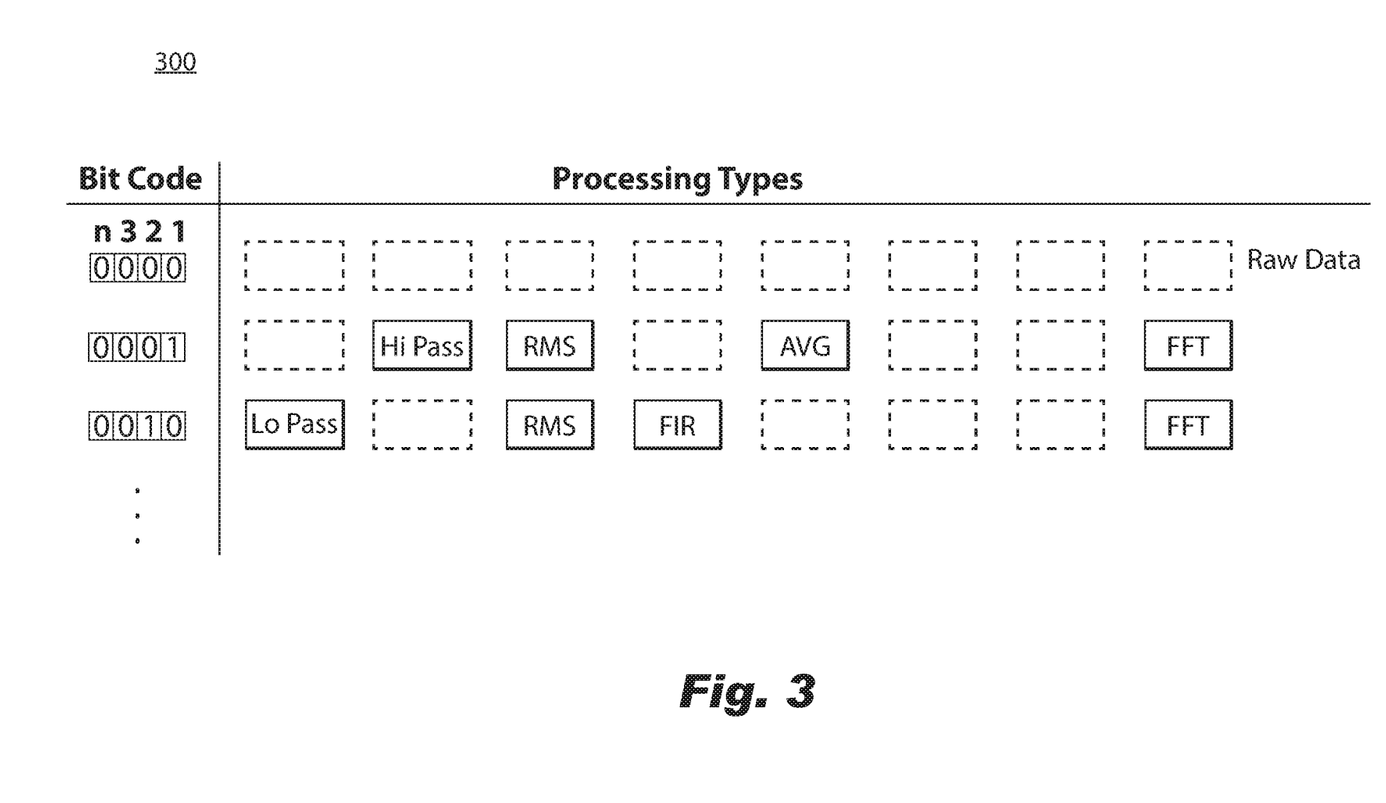
FIG. 3 is a schematic diagram of a coded bitstring map correlating example coded bitstrings to example on/off states of example processing functions corresponding to associated processing modules.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIGS. 1A and 1B and is designated generally by reference character 100. Other embodiments and/or aspects of this disclosure are shown in FIGS. 2A-3. Certain embodiments described herein can be used to improve the functionality of sensor systems by providing configurable processing without requiring recertification and also without the need for complex control schemes.

Referring to FIGS. 1A and 1B, a sensor system 100 can include a sensor 101 configured to output raw sensor data (e.g., an analog or digital signal). For example, the sensor 101 can be a physical sensor configured to physically react to an environmental condition to produce an electrical signal that can be output as raw data. The sensor 101 can be a data probe for an aircraft, e.g., a smart data probe as appreciated by those having ordinary skill in the art. The data probe can include an accelerometer, a pitot tube, or any other suitable data sensor for example. Any suitable type of sensor and/or physical structure therefor is contemplated herein.

The system 100 can include a plurality of processing modules 103a-p configured to process the raw sensor data from the sensor 101 to output processed sensor data. In certain embodiments, the system 100 can include a state module 105a-p for each processing module 103a-p operative to cause a respective processing module 103a-p to receive and/or process the sensor data.

The system 100 can include a control module 107 configured to receive a coded bitstring 109 (e.g., as shown in FIGS. 2A and 2B) and activate or deactivate a predefined set of state modules 105a-p based on the coded bitstring 109 to control which processing modules 103a-p process the sensor data and/or an order of processing. The control module 107 can be operatively connected to any suitable input to receive one or more coded bitstrings (e.g., an external computer connected wirelessly or hardwired).

The coded bitstring 109 can include a plurality of discrete bits (e.g., 4 bits as shown, 16 bits, 32 bits, or any other suitable number of bits) less than the amount of processing modules 103a-p and/or state modules 105a-p (e.g., 16 modules as shown in FIGS. 1A-2B, 8 modules as shown in FIG. 3), for example. As shown, each discrete bit can be configured to include a 1 or a 0 such that each coded bitstring can be a bitstring consisting of 1s and/or 0s. Any other suitable format is contemplated herein.

Referring additionally to FIGS. 2A and 2B, in certain embodiments, a plurality of the state modules (e.g., 105a, 105f, 105n as shown FIGS. 2A and 2B) and/or processing modules (e.g., 103a, f, n as shown in FIGS. 2A and 2B) can be associated with at least one discrete bit of the plurality of discrete bits such that each coded bitstring corresponds to a predetermined group of state modules (e.g., 105a, 105f, 105n as shown FIGS. 2A and 2B) and/or processing modules (e.g., 103a, f, n as shown in FIGS. 2A and 2B).

In certain embodiments, the plurality of state modules (e.g., 105a, 105f, 105n as shown FIGS. 2A and 2B) can be configured to be turned on when an associated bit of the plurality of discrete bits is a 1 (e.g., the first bit as shown). The plurality of state modules (e.g., 105a, 105f, 105n as shown FIGS. 2A and 2B) can be configured to be turned off when the associated bit is 0. In certain embodiments, each of the state modules 105a-p can be associated with at least one discrete bit of the plurality of discrete bits such that at each (e.g., all) of the state modules 105a-p can be turned on and off (individually or in a group). Accordingly, in certain embodiments, a plurality of state modules (e.g., 105a, 105f, 105n as shown FIGS. 2A and 2B) can be associated with a single bit (e.g., in a fixed relationship). For example, the association can be such that the associated state modules 105a, 105f, 105n, e.g., as shown FIGS. 2A and 2B, are turned on when the associated bit, e.g., the first bit, is 1 and off when the associated bit, e.g., the first bit is a 0, or vice versa, for example). In certain embodiments, the opposite may be true such that the associated state modules can be turned off when an associated bit is a 1, and on when an associated bit is 0. Any suitable bit value for on or off is contemplated herein, and whether 0 or 1 is on or off can vary by each associated plurality of state modules.

In certain embodiments, referring additionally to FIG. 3, the predetermined group of state modules (e.g., associated with the processing type of FIG. 3) can be configured to be turned on (e.g., by the control module 107 to cause data to be processed by the group of processing module, e.g., 103a, f, n as shown in FIGS. 2A and 2B) for an associated bitstring. As shown, a remainder of state modules (e.g., associated with the processing type of FIG. 3) can be configured to be turned off for the associated bitstring (e.g., by the control module 107 to bypass the remaining processing modules 103a-p).

As shown in FIG. 3, a portion of an example coded bitstring correlation map 300 is shown (e.g., for a system having eight processing modules). The map 300 can include correlations between whole bitstrings and processing states. The control module 107 can include the coded bitstring correlation map 300 and be configured to operate the state modules (e.g., 105a-p as shown in FIGS. 2A and 2B, less shown in FIG. 3) and/or the processing modules (e.g., 103a-p as shown in FIGS. 2A and 2B, less shown in FIG. 3) as dictated by the coded bitstring correlation map 300. For example, as shown in FIG. 3, a four bit coded bitstring can be used, 0000 can correlate to raw data output, 0001 can correlate to a plurality of processing modules being turned on (e.g., hi pass filter, RMS, average) while others are off, and 0010 can be correlated to a second plurality of processing modules being turned on (e.g., low pass filter, RMS, FIR) while others are off. Four bit embodiments can allow for up to 16 possible processing states as opposed to the 256 potential states if all 8 processing steps could be performed in any combination, for example Any suitable number of bits for any suitable number of available processing steps are contemplated herein.

Any other suitable coded bitstrings and state correlations are contemplated herein. Any other suitable use of a coded bitstring by the control module 107 to control the state modules 105a-p and/or processing modules 103a-p is contemplated herein.

Processing modules 103a-p can be configured to perform any suitable processing function. For example, as shown below in Table 1, one or more of processing modules 103a-p, e.g., as shown in FIGS. 1 and 2, can be configured to be a low pass filter, a high pass filter, a RMS processor, a decimation processor, a fast Fourier transform (FFT) processor, a standard deviation processor, and/or any other suitable type of processor/filter.

TABLE 1

| Processing Module Position | Processing Type |
|---|---|
| 1 | Lo-Pass Filter |
| 2 | Hi-Pass Filter |
| 3 | RMS 1 |
| 4 | Decimation 1 |
| 5 | Average 1 |
| 6 | Lookup Table 1 |
| 7 | FFT 1 |
| 8 | Standard Deviation 1 |
| 9 | Lo-Pass Filter |
| 10 | Hi-Pass Filter |
| 11 | Average 2 |
| 12 | Lookup Table 2 |
| 13 | Standard Deviation 2 |
| 14 | FFT 2 |
| 15 | RMS 2 |
| 16 | Decimation 2 |

Referring to FIGS. 2A and 2B, represented graphically, the processing flow options selected by the above example coded bitstring 1000 is shown. State modules 105a, 105f, and 103n are a switch commanded to the on position, which causes data flow to processing modules 103a, 103f, and 103n. Any other suitable data flow for example coded bitstring 1000 is contemplated herein. Any other suitable number of bits in the coded bitstring is contemplated herein.

In certain embodiments, a state module 105a-p can be operative to configure one or more processing characteristics (e.g., frame rate, sample size, etc.) of a respective processing module 103a-p (e.g., with a sub coded bitstring that configures a processing module 103a-p). In certain embodiments, one or more of the processing modules 103a-p can be configured to receive a sub coded bitstring (e.g., similar to coded bitstring 109) and to modify a processing characteristic of the processing module 103a-p).

In certain embodiments, each state module 105a-p can be connected to an input of a respective processing module and an input of a respective logic gate, e.g., an OR block as shown. The logic gate can include any suitable logic gate (e.g., an OR block, NOR block, XOR block, NAND block). An output of the respective processing module 103a-p can be connected to the input of the logic gate. The state module 105a-p can be configured to either output to the respective processing module 103a-p or the respective logic gate to bypass the respective processing module 103a-p, e.g., as shown. The respective logic gate can be configured to output only data from one of a respective state module 105a-p or a respective processing module 103a-p. It is contemplated that any other suitable logic flow and/or logic components are contemplated herein. For example, discrete operational blocks (e.g., the OR blocks) may not be necessary and can be eliminated in certain embodiments.

As shown, the system 100 can include a first state module 103a configured to receive raw sensor data from the sensor 101 or a first logic gate connected to the sensor 101. The system 101 can include a last state module 103p or last logic gate configured to output processed data from the sensor system 100. In certain embodiments, each state module 105a-p after the first state module 105a can be connected to a respective logic gate to receive an input from the respective logic gate, e.g., as shown.

Any suitable number of processing modules 103a-p and/or state modules 105a-p are contemplated herein. As appreciated by those having ordinary skill in the art in view of this disclosure, the embodiments shown and described are representative of certain functional modules of a system 100. It is contemplated that the processing modules 103a-p, the state modules 105a-p, and the control module 107 can be implemented in a single module and/or any suitable number of separate modules having any suitable hardware and/or computer software (e.g., including firmware). In certain embodiments, the processing modules and the state modules can be the same module. In certain embodiments the processing modules, the state modules, and the control module can be hosted on a single computerized device associated with the sensor 101 (e.g., hosted in a memory of a sensor 101 and/or on a circuit of sensor 101). It is contemplated that the control module 107 and the state modules 105a-105p can be a single module, for example. It is also contemplated that the control module 107 can be a plurality of modules (e.g., one for each state module 105a-105b) or can be hosted in each state module 105a-p and/or processing module 103a-p. Any suitable partitioning of modules and/or functions thereof amongst any suitable hardware module(s) and/or software module(s) in any suitable manner is contemplated herein.

Any suitable user GUI or data input to on any suitable computing device is contemplated herein. For example, a user can manually input numbers into a coded bitstring field, or a graphical selection list (e.g., interactive, moveable boxes labeled with possible processing functions for selecting processing functions and/or arranging a suitable order of processing). Any other suitable input into the control module 107 is contemplated herein.

In accordance with at least one aspect of this disclosure, a signal processing system can include a plurality of processing modules configured to process raw data (e.g., sensor data from a sensor) to output processed data, a state module for each processing module operative to cause a respective processing module to receive and/or process the data, and a control module configured to receive a coded bitstring and activate or deactivate a predefined set of state modules based on the coded bitstring to control which processing modules process the data and/or an order of processing. Any other suitable embodiments of the signal processing system are contemplated herein (e.g., as described above with respect to a sensor system).

A method for signal processing (e.g., in a sensor system) can include creating a coded bitstring having a plurality of discrete bits, each discrete bit or the plurality of discrete bits associated with a plurality processing modules, sending the coded bitstring to a control module to control which processing modules process sensor data and/or in which order, selecting processing modules and/or an order thereof to process sensor data using the control module based on the coded bitstring, and processing sensor data using the processing modules in accordance with the coded bitstring to output processed data. Creating the coded bitstring can include assigning a 1 or a 0 to each discrete bit. In certain embodiments, creating the bittering can include correlating a single bit with a plurality of processing modules, and correlating the bit state with an on or off state of the plurality of processing modules. For example, in certain embodiments, selecting processing modules can include using a plurality of respective processing modules when an associated bit is a 1, and not using a plurality of respective processing modules when an associated bit is a 0.

In certain embodiments, creating the coded bitstring can include correlating a bitstring (e.g., any plurality of bits, e.g., an entire bitstring or multibit portion of an entire bitstring) to a desired state of the processing modules, for example (e.g., using correlation data, e.g., a map). For example, in certain embodiments selecting processing modules can include correlating a coded bitstring (e.g., a bitstring of 1s and 0s, using a correlation map, e.g., 300) to a predetermined plurality of on states for a first plurality of state modules, and off states for a second plurality of state modules (e.g., a remainder of state modules).

Embodiments can provide post processing coded bitstring permutation options for sensor channels. Embodiments include a method of providing a predefined set of processing options that can be selected without modification of software or firmware. A user can select the desired processing operations through the use of a coded bitstring (e.g., sent from a suitable GUI operated by the user to the control module 107) to detail which pluralities of processing options will be utilized and/or define the order of processing to be performed (e.g., as set forth in a coded bitstring map or in a fixed relationship with each bit of the coded bitstring). In certain embodiments, each type of processing can be further configured through a set configuration messages (e.g., sub coded bitstrings sent to the processing modules 103*a-p* and/or state modules 105*a-p* to configure the processing module in accordance with the coded bitstring).

While FIGS. 1A and 1B show digital data processing, it is contemplated that one or more analog processing types can be utilized (independent of or in addition to digital processing), e.g., an ADC and associated analog front end can be included for when the sensor data is analog. Embodiments can be used to change the front end for signals going into an ADC. For example, processing on the analog side, you could activate a high-pass or band-pass filter to reduce noise and maximize bitdepth for the signals of interest. So if ultra-sonic or acoustic emission data is desired, for example, one or more filters for an acquisition could be activated using the bitcode, and if traditional vibratory measurements (e.g., from an accelerometer) are being take, the one or more analog filters can be turned off (e.g., or put on a low-pass filter).

Embodiments do not correlate one bit to each processing module and/or state module since there are less bits than processing modules and/or state modules. In such circumstances, at least two processing modules/state modules can be associated with a single bit or coded bitstrings. It is contemplated that one or more remaining bits can be associated with a single processing module and/or state module, however. It is contemplated that a coded bitstring can include more bits than are used by the processing modules and/or state modules (e.g., for any suitable purpose) such that less than all bits are used.

Embodiments group some processing states together and allow the use of less bits. It is contemplated that less than all possibilities of combinations of processing states may be useable, but embodiments can be more efficient and equally as effective where common processing states are only being utilized anyhow. Embodiments can include a control module that can receive the coded bitstring and correlate it to a series of states for each processing module, for example. The correlation map can be installed on the control module at a factory, for example. In certain embodiments, the map can be updatable if desired, after manufacture and installation.

Embodiments include a method of configuring processing options in smart sensing systems by means of bit coding configuration. The coded bitstring configuration can include a plurality of discrete bits which can constitute a subset of the total available processing permutations. Each state module, processing module, and/or options within a module does not need to be associated with at least one discrete bit but rather can represent the most desirable or most frequently needed processing configurations and options, which can reduce the length of the data stream used for specification of the configurable processing options.

Embodiments can be applied to condition monitoring systems, for example. Such condition monitoring systems can be used to monitor parameters in machinery via temperature, pressure, vibration sensors, etc., to detect the development of faults as compared to normal operating conditions. The sensor data collected can be digitized, transformed, and algorithmically processed to extract features of the monitored system. A given feature can be generated from the input of one sensor or could be dependent on the interaction of multiple sensors. Features extracted can be compared against expected values, enumerating the relative health of that feature. Sensor data can be monitored and evaluated on a scheduled basis, as a function of the regime the monitored system is in, and/or based upon the detection of an event outside of normal operating conditions. Traditional implementations of a condition monitoring system can include a number of analog sensors feeding into a central host for digitization and further processing. Traditional implementation requires individual cabling for each analog sensor and can result in a heavy system and complicated installation. These issues can be mitigated by distributing digitization and processing of data out locally to the sensor. Sensors that have the capability to perform local digitization and processing are known as digital or smart sensors. Local processing of data can reduce the processing load on the host, allowing the host to perform other more complex functions, or decrease in size and complexity. Transmission of digital data allows multiple digital sensors to be connected on a single digital bus, reducing the wire weight associated with individual analog wire runs for each sensor.

Local processing is not necessarily easy to achieve, especially for commercial certified aerospace applications where cost is counterbalanced by DO-178 and DO-254 certification processes. It is desirable for, and embodiments can provide, a scalable smart sensing system to accommodate many processing types out of the box with minimal configuration and no firmware or software modification. To accomplish, embodiments can utilize a coded bitstring selection command to control what processing is desired to be invoked and the order in which it will be invoked. Each processing type can have default values that can then also be reconfigured with a specific set of commands for that processing type. For example the decimation process type may have a default to decimate by half (selecting every other data point). This can be configured to 1 out of 10 or any other integer within the dataset size, for example.

Traditional processing options are hard coded in software or firmware requiring modification to code to enhance the available processing. Certain embodiments of this disclosure, however, allow predefined process options and predefined order of those processing options which can allow a user to select which processing the user would like to invoke/use (and/or in which order) to achieve the desired processed dataset. Each processing option can also be configurable with a separate command set in any suitable manner (e.g., for the decimation processing type, a sub coded bitstring can configure how much to decimate the dataset by).

While embodiments are disclosed with respect to sensor systems, embodiments are applicable for any suitable system. Embodiments can allow movement of data more efficiently while trying to maintain flexible yet deterministic system communication protocols.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system," for example. A "circuit," "module," or "system," for example, can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A sensor system, comprising:
a sensor configured to output raw sensor data;
a plurality of processing modules configured to process the raw sensor data from the sensor to output processed sensor data;
a state module for each processing module operative to cause a respective processing module to receive and/or process the sensor data; and
a control module configured to receive a coded bitstring and activate or deactivate a predefined set of state modules based on the coded bitstring to control which processing modules process the sensor data and/or an order of processing,
wherein the coded bitstring includes a plurality of discrete bits less than the amount of processing modules and/or state modules, wherein a plurality of the state modules and/or processing modules are associated with at least one discrete bit of the plurality of discrete bits such that each coded bitstring corresponds to a predetermined group of state modules and/or processing modules.

2. The system of claim 1, wherein each discrete bit is configured to include a 1 or a 0 such that each coded bitstring is a bitstring consisting of 1s and/or 0s.

3. The system of claim 2, wherein the predetermined group of state modules are configured to be turned on for an associated bitstring, and wherein a remainder of state modules are configured to be turned off for the associated bitstring.

4. The system of claim 2, wherein the plurality of state modules are configured to be turned on when an associated bit of the plurality of discrete bits is a 1, and wherein the plurality of state modules are configured to be turned off when the associated bit is 0, wherein each of the state modules is associated with at least one discrete bit of the plurality of discrete bits such that at each of the state modules can be turned on and off.

5. The system of claim 1, wherein each state module is connected to an input of a respective processing module and an input of a respective logic gate, wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

6. The system of claim 5, further including a first state module configured to receive raw sensor data from the sensor or a first logic gate connected to the sensor.

7. The system of claim 6, further including a last state module or last logic gate configured to output processed data from the sensor system.

8. The system of claim 7, wherein each state module after the first state module is connected to a respective logic gate to receive an input from the respective logic gate.

9. The system of claim 1, wherein the sensor is a data probe for an aircraft.

10. The system of claim 1, wherein the data probe includes an accelerometer.

11. A signal processing system, comprising;
a plurality of processing modules configured to process raw sensor data from a sensor to output processed sensor data;
a state module for each processing module operative to cause a respective processing module to receive and/or process the sensor data; and
a control module configured to receive a coded bitstring and activate or deactivate a predefined set of state modules based on the coded bitstring to control which processing modules process the sensor data and/or an order of processing,
wherein the coded bitstring includes a plurality of discrete bits less than the amount of processing modules and/or state modules, wherein a plurality of the state modules and/or processing modules are associated with at least one discrete bit of the plurality of discrete bits such that each coded bitstring corresponds to a predetermined group of state modules and/or processing modules.

12. The system of claim 11, wherein each discrete bit is configured to include a 1 or a 0 such that each coded bitstring is a bitstring consisting of 1s and/or 0s.

13. The system of claim 12, wherein the predetermined group of state modules are configured to be turned on for an associated bitstring, and wherein a remainder of state modules are configured to be turned off for the associated bitstring.

14. The system of claim 12, wherein the plurality of state modules are configured to be turned on when an associated bit of the plurality of discrete bits is a 1, and wherein the plurality of state modules are configured to be turned off when the associated bit is 0, wherein each of the state modules is associated with at least one discrete bit of the plurality of discrete bits such that at each of the state modules can be turned on and off.

15. The system of claim 11, wherein each state module is connected to an input of a respective processing module and an input of a respective logic gate, wherein an output of the respective processing module is connected to the input of the logic gate, wherein the state module is configured to either output to the respective processing module or the logic gate to bypass the respective processing module, wherein the respective logic gate is configured to output only data from one of a respective state module or a respective processing module.

16. The system of claim 15, further including a first state module configured to receive raw sensor data from the sensor or a first logic gate connected to the sensor.

17. A method for signal processing, comprising:
creating a coded bitstring having a plurality of discrete bits, each discrete bit or the plurality of discrete bits associated with a plurality processing modules wherein the coded bitstring includes a plurality of discrete bits less than the amount of processing modules and/or state modules;
sending the coded bitstring to a control module to control which processing modules process sensor data and/or in which order;
selecting processing modules and/or an order thereof to process sensor data using the control module based on the coded bitstring; and
processing sensor data using the processing modules in accordance with the coded bitstring to output processed data.

18. The method of claim 17, wherein creating the coded bitstring comprises assigning a 1 or a 0 to each discrete bit, wherein selecting processing modules includes using a plurality of respective processing modules when an associated bit is a 1, and not using a plurality of respective processing modules when an associated bit is a 0.

* * * * *